Patented May 23, 1933

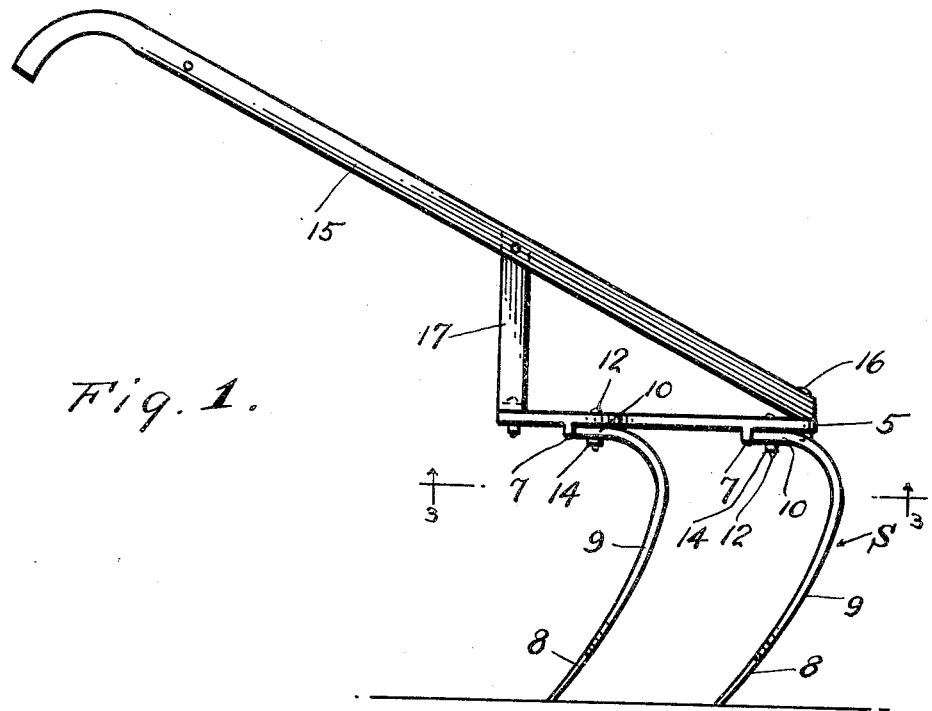
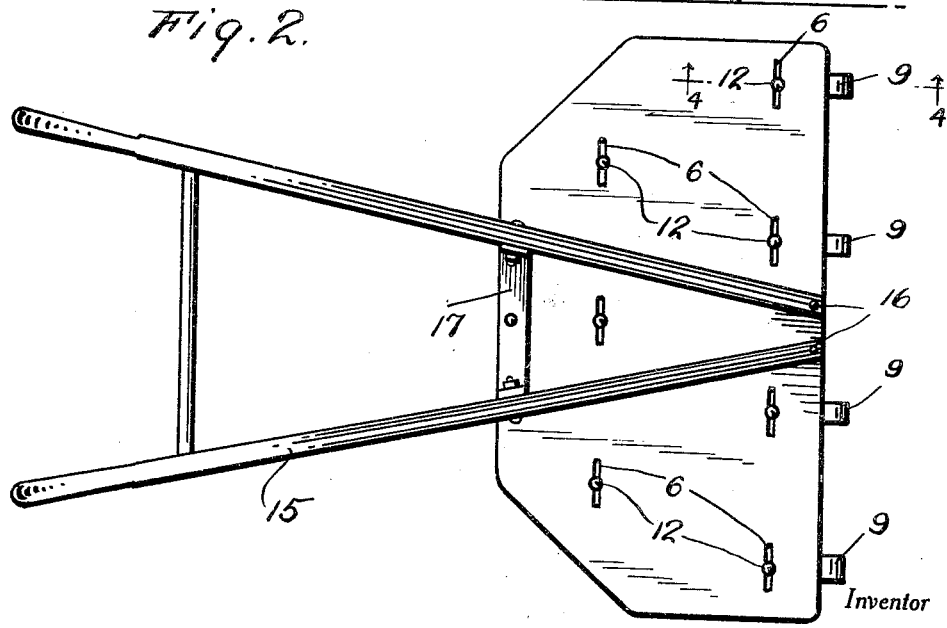

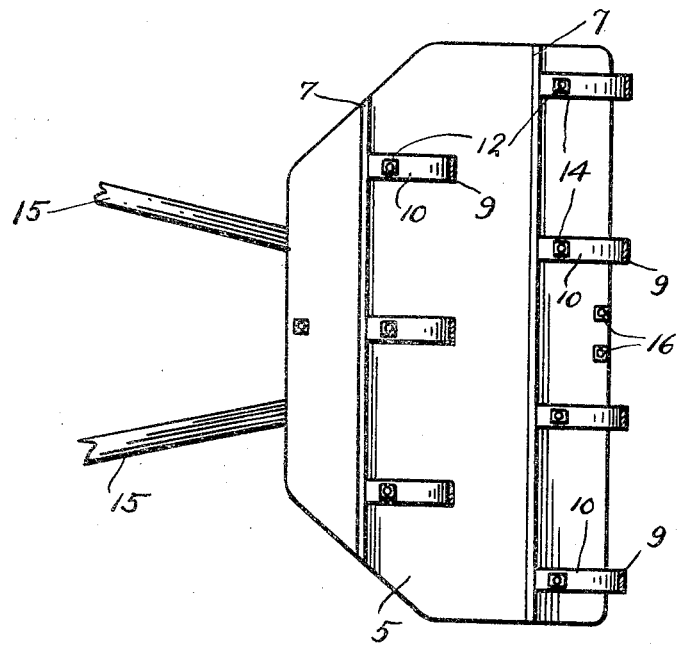
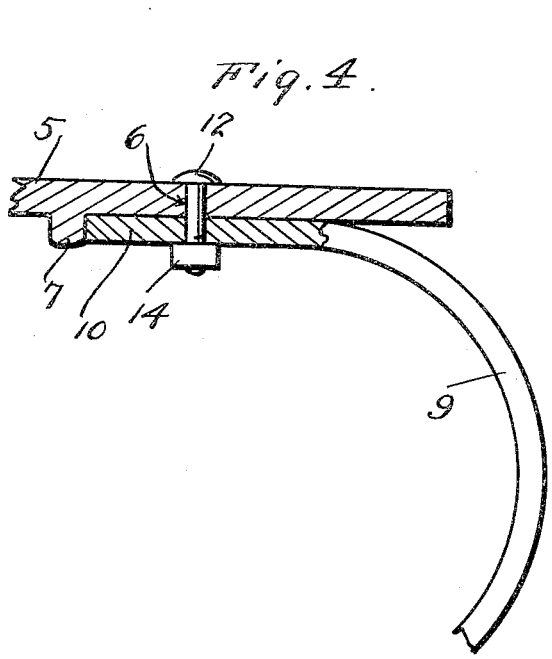
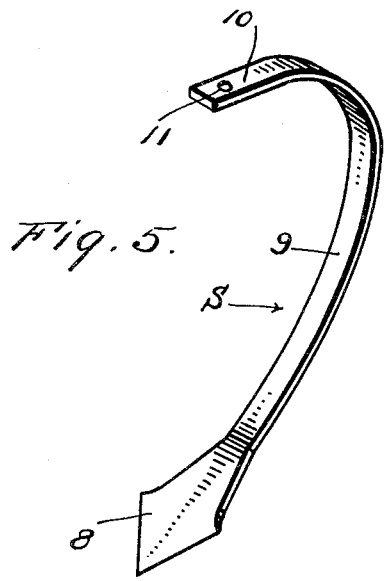

1,910,042

UNITED STATES PATENT OFFICE

EMANUEL NYMAN, OF FOLEY, MINNESOTA

HAND CULTIVATOR

Application filed November 24, 1931. Serial No. 577,081.

The present invention relates to a cultivator to be pulled along by hand while a person is walking backwards, has for its object to provide a structure which is easy to manipulate, strong and durable, inexpensive to manufacture, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a cultivator embodying the features of my invention.

Figure 2 is a top plan view thereof.

Figure 3 is a bottom plan view thereof showing the shovels in section substantially on the line 3—3 of Figure 1.

Figure 4 is an enlarged detail section taken substantially on the line 4—4 of Figure 2, and Figure 5 is a perspective view of one of the shovels.

Referring to the drawings in detail it will be seen that the numeral 5 denotes a plate provided with a plurality of transversely disposed slots 6 arranged in two rows and on the under face of the plate is a pair of ribs 7 one adjacent each row of slots 6 a little forwardly thereof. Letters S denote shovels including blades 8 and shanks 9 which merge upwardly therefrom inclining upwardly and rearwardly and terminating in forwardly directed upper end portions 10 having openings 11 to receive bolts 12 which extend through the slots 6 and have nuts 14 engaged therewith.

The forward extremities of the ends 10 abut the ribs 7. The handle bars 15 are secured at their lower ends as at 16 on the plate 5 adjacent the rear end thereof and incline upwardly and forwardly therefrom, a brace 17 fixed to the plate 5 adjacent the forward edge thereof being also secured to intermediate portions of the handle bars so that they diverge forwardly from each other.

It will be noted that the blades 8 are of a somewhat diamond shape and have their lower edges sharpened.

The cultivator is operated by a person walking backwards, pulling the cultivator. It pulls very easily due to the very light resistance from pulling through the soil made possible because of the nature of the shovels. It will be apparent that the number of the shovels may be varied and may be arranged to suit the cultivating process to be carried out.

It is thought that the construction, utility and advantages of this invention will now be quite apparent to those skilled in this art without a more detail description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A hand cultivator comprising a flat horizontally arranged plate having a transversely extending rib on its under face, a row of transversely extending slots in said plate paralleling the rib and being located rearwardly thereof, a plurality of shovels, each having a shank, the upper end of which is substantially horizontal with its upper face contacting the bottom face of the plate and with its extremity abutting the rear face of the rib, bolts passing through the slots and through said horizontal portions of the shanks, handles having their rear ends connected to the upper face of the plate at the rear thereof, and a brace member connected to the upper face of the plate at the front thereof with the upper parts of the brace connected with intermediate portions of the handles.

In testimony whereof I affix my signature.

EMANUEL NYMAN.